United States Patent [19]
Goehner et al.

[11] Patent Number: 5,565,164
[45] Date of Patent: Oct. 15, 1996

[54] METHOD AND APPARATUS FOR DENSIFYING A THERMOPLASTIC POLYMER

[75] Inventors: John C. Goehner, Bedford, N.H.; Kenneth J. Goehner, Portland, Oreg.

[73] Assignee: Limited Resources, Inc., Portland, Oreg.

[21] Appl. No.: 405,587

[22] Filed: Mar. 17, 1995

[51] Int. Cl.⁶ .................................................. B29C 67/20
[52] U.S. Cl. .................. 264/321; 264/15; 264/DIG. 69; 425/305.1; 425/383
[58] Field of Search ................ 264/321, DIG. 69, 264/15; 425/305.1, 383

[56] References Cited

U.S. PATENT DOCUMENTS

| | | | |
|---|---|---|---|
| Re. 32,032 | 11/1985 | Pettingell | 264/53 |
| 3,475,525 | 10/1969 | Peters | 264/101 |
| 3,615,187 | 10/1971 | Suzukawa et al. | 264/15 |
| 3,755,520 | 8/1973 | Cogliano | 264/53 |
| 4,246,208 | 1/1981 | Dundas | 264/15 |
| 4,504,436 | 3/1985 | Louvier | 264/321 |
| 4,588,366 | 5/1986 | Glatt | 425/222 |
| 5,143,534 | 9/1992 | Kilner et al. | 264/15 |
| 5,185,380 | 2/1993 | Diessel et al. | 521/49 |
| 5,286,321 | 2/1994 | Fuss | 156/84 |
| 5,513,807 | 5/1996 | Stricker . | |

*Primary Examiner*—Mary Lynn Theisen
*Attorney, Agent, or Firm*—Chernoff, Vilhauer, McClung & Stenzel

[57] ABSTRACT

A method and apparatus for densifying a thermoplastic polymer are disclosed. Particles of a thermoplastic polymer are introduced into a chamber, suspended with a fluid flow in the chamber, and while suspended, the particles are heated and softened to form pieces of densified thermoplastic polymer which are too dense to remain suspended in the fluid flow. The pieces of densified polymer are collected from the bottom of the chamber. A range of particle sizes can be efficiently and continuously densified without adjusting the apparatus.

16 Claims, 1 Drawing Sheet

METHOD AND APPARATUS FOR DENSIFYING A THERMOPLASTIC POLYMER

BACKGROUND AND SUMMARY OF THE INVENTION

The present invention relates to a method and apparatus for recycling thermoplastic polymers and in particular to a method and apparatus for densifying an expanded thermoplastic polymer.

Polymers can be classified as thermoplastic or thermosetting polymers. Thermosetting polymers are polymers that have sites on their chains at which cross-links between chains are formed when the polymer is heated for the first time. Such polymers can be heated once to softening and molded into particular shapes. The polymers retain these shapes on cooling. Because of the cross-linking that occurs at the elevated temperature, reheating does not reverse the process; instead of becoming soft, the thermosetting polymers degrade or decompose upon reheating. Thermoplastic polymers lack sites on their chains at which cross-links between chains can be formed. These polymers soften when heated and can be molded into desired shapes the polymers retain on cooling. Moreover, the thermoplastic polymers have a linear macromolecular structure that is able to undergo repeated cycles of heating, softening, reshaping and cooling. Thus, thermoplastic polymers can be recycled, for example, by adding a certain percentage of previously-used material when manufacturing new articles from the same type of thermoplastic polymers. Certain products may be made completely of previously-used and recycled thermoplastic polymers. Examples of thermoplastic polymers include polystyrenes, polyethylenes, polypropylenes, polyvinyls, nylons and cellulosics.

An expanded thermoplastic polymer may be prepared by mixing the polymer and a blowing agent at elevated temperature and pressure, and extruding the mixture through a suitable aperture into a zone of lower pressure, for example, atmospheric pressure. At the lower pressure the blowing agent, which is typically a low-boiling, volatile liquid or a compound that exists as a liquid at the elevated temperature and pressure conditions, vaporizes, forming a multiplicity of gas-filled cells and expanding the thermoplastic polymer. When an expanded thermoplastic polymer is reheated to the softening range of the polymer, the gas-filled cells are collapsed, and the expanded thermoplastic polymer is densified. As used herein, the softening range is the temperature range in which a thermoplastic polymer goes from a rigid to a soft condition.

Expanded thermoplastic polymers, which are also known as plastic foams, are used extensively to make molded and loose fill packaging material, and disposable cups and food containers. An expanded thermoplastic polymer such as expanded polystyrene is inexpensive to produce, is light and durable, and has excellent insulating properties. Unfortunately, although thermoplastic polymers can be recycled, the expanded thermoplastic polymer has such a low density, and consequently occupies such a large volume, that it is not cost-effective to transport the material to a recycling center. As a result, millions of metric tons of expanded thermoplastic polymers end up in landfills rather than recycling centers.

U.S. Pat. No. 5,286,321 to Fuss discloses a method for densifying expanded thermoplastic materials by confining the material in a vertical mesh chute and heating the material in the lower portion of the chute to collapse and densify the expanded thermoplastic material. However, this apparatus requires all of the expanded thermoplastic particles to be about the same size because if a range of particle sizes is introduced into the chute, a heat gradient is created which results in some particles receiving insufficient heat to densify the particles while other particles may be overheated and begin to degrade or decompose. In addition, a person or a device is required to evaluate the densified material and determine when the material is sufficiently densified and ready for removal from the chute.

Thus, there is still a need for a method and apparatus for densifying expanded thermoplastic polymers which can process a range of particle sizes efficiently and economically.

According to the present invention, such a need is satisfied by introducing particles of a thermoplastic polymer into a chamber, suspending the particles with a fluid flow in the chamber, and while suspending the particles, heating and softening the particles to form pieces of densified thermoplastic polymer which are too dense to remain suspended in the fluid flow. Thus, a range of particle sizes can be efficiently densified without adjusting the apparatus because the smaller or lighter particles quickly densify and are no longer suspended in the fluid flow while the larger particles remain suspended until each one has absorbed a sufficient amount of heat to densify the larger particle. Thus, a wide range of particle sizes can be densified effectively and continuously without outside intervention by a human operator. Expanded thermoplastic polymers having a density as low as 2.4 kg/m$^3$ can be densified.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
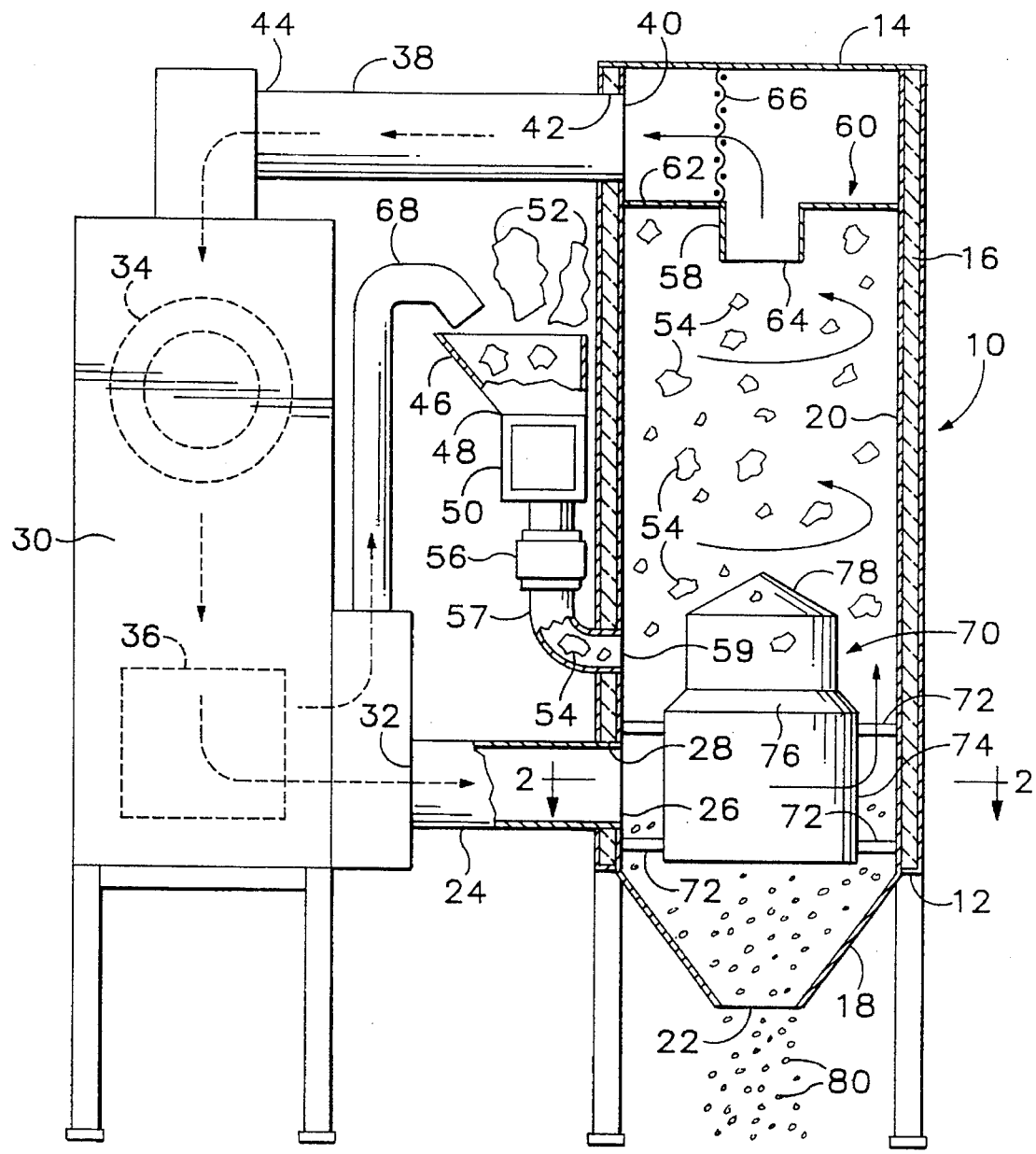
FIG. 1 is a partially sectional side view of an exemplary system embodying the present invention.

Referring now to an exemplary embodiment illustrated in the drawings, a vertical enclosure 10, which is preferably a cylinder, has a bottom end 12, a top end 14, a layer 16 of thermal insulation defining a vertical chamber 20, and an outlet cone 18 defining an outlet opening 22. A first conduit 24 has a first end 26 attached proximate the bottom end 12 of the enclosure 10 at an inlet 28 into the chamber 20, and a second end 32 attached proximate the bottom of a housing 30 that contains a high velocity blower 34 and a heat source 36. A second conduit 38 has a first end 40 attached proximate the top end 14 of the enclosure 10 at an outlet 42 from the chamber 20, and a second end 44 attached proximate the top of the housing 30. The conduits 24, 38 are in fluid communication through the housing 30 and the enclosure 10 and a hot fluid flow through the chamber 20 is provided when the blower 34 and the heat source 36 are energized.

A hopper 46 for receiving the recyclable thermoplastic polymer has an outlet end 48 directed into a grinder 50 or similar device for reducing the size of large blocks 52 of the expanded thermoplastic polymer to smaller particles 54. The grinder 50 may be replaced with an equivalent device such as an auger or omitted for loose fill thermoplastic packaging material. A blower 56, or a paddle fan, wing pulley or a similar metering device, aids in directing the thermoplastic polymer particles 54 from the grinder 50 through a conduit 57 and into the chamber 20 through an aperture 59 located above the fluid flow inlet 28. Alternatively, the aperture 59 may be located closer to or proximate the top 14 of the enclosure 10, or the conduit 57 may discharge into the first conduit 24 proximate the first end 26 so that the particles 54 are entrained in the fluid flow through the inlet 28 into the chamber 20. The fluid flowing in the first conduit 24 through the inlet 28 and into the chamber 20, suspends the particles 54 in the fluid flow in the chamber where the particles will be heated, softened and densified. The preferred size of the particles 54 depends upon the volume of the fluid flow and the size of the chamber 20; the maximum particle size is the largest particle that is suspendable in the fluid flow.

A baffle 60, located proximate the top of the chamber 20, is a cylinder 58 having a wide flange 62 that attaches to the wall of the chamber and a central cylinder opening 64. The baffle 60 inhibits the escape of particles 54 from the top of the chamber 20 while allowing the fluid to flow from the chamber through the opening 64. A screen 66 is located proximate the outlet 42 from the chamber 20 or proximate the cylinder opening 64 to prevent any thermoplastic polymer particles 54 or other particulate matter from exiting the chamber through the second conduit 38.

In a preferred embodiment, the fluid flow is a gas flow, and the gas, for example, air, is heated by moving the gas past the heat source 34. The heat source can be an electric heater, a solar furnace or a solar-heated oil-filled pipe, a natural gas, propane or oil burner, or any other convenient source of heat. The actual heat exchanger (not shown) can be mounted in the gas stream in the housing 30 or in the chamber 20, around the first conduit 24, or around the chamber. For maximum efficiency the conduits and the housing are also insulated to conserve heat. As shown in FIG. 1, the high velocity blower 34 moves the gas past the heat source 36 to heat the gas to a temperature within the softening range of the particular thermoplastic polymer being densified. A conduit 68 diverts a portion of the heated gas through the hopper 46 and the grinder 50 to preheat the thermoplastic polymer particles 54 before they enter the chamber 20.

Figure 2:
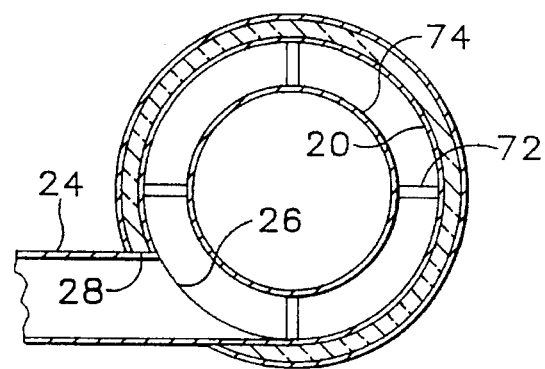
FIG. 2 is a sectional view taken along line 2—2 of FIG. 1.

The fluid flows through the chamber 20 preferably in an organized flow which maximizes the time the fluid remains in the chamber. In a preferred embodiment the fluid flows helically, in a cylindrical spiral, through the chamber 20. As shown in FIG. 2, the first conduit 24 is connected to the enclosure 10 to direct initially the fluid flow into the chamber 20 tangentially about a baffle 70 mounted proximate the bottom of the vertical chamber 20 to encourage the fluid to flow helically through the chamber. The baffle 70 is attached to the wall of the chamber by at least one rod 72 or brace, or alternatively, may be mounted on a post. The baffle 70 preferably has a cylindrical base 74, a beveled shoulder portion 76 and a top cone portion 78. The baffle 70 helps to increase the pressure of the fluid proximate the bottom of the chamber 10 and the base of the baffle relative to the portion of the chamber proximate the top of the baffle. Alternatively, the first conduit 24 may be connected to the enclosure 10 so that the chamber-entering high velocity fluid impinges directly on the baffle 70 which creates, in effect, a high pressure area proximate the bottom of the chamber 20 compared to a lower pressure area proximate the top of the chamber. In the latter system the baffle 70 acts as a nozzle to direct fluid from the area of higher pressure proximate the baffle to the area of lower pressure above the baffle. The pressure differential provided by the baffle 70 ensures that the low density thermoplastic polymer particles 54 rise and remain in the chamber, and do not enter the outlet cone 18, until they have densified. As the high velocity fluid flows through the chamber 20 the low density buoyant particles 54 are suspended in the chamber with the fluid flow. In the chamber 20 heat is transferred from the heated fluid to the suspended particles 54. As each particle 54 absorbs sufficient heat to reach the softening range of the thermoplastic polymer the polymer softens, the structure of the particle collapses, and the particle forms a piece 80 of densified thermoplastic polymer which is too dense to remain suspended in the fluid flow.

In operation, for example, to densify molded expanded polystyrene, the blower 34 and the heat source 36 are energized to produce a fluid flow such as a high velocity flow of hot air. For expanded polystyrene the softening range is 165° to 195° C., and the gas is preferably heated to at least 165° C. When the fluid flow has reached the desired temperature, the hopper 46 is loaded with blocks 52 of molded expanded polystyrene, and the blocks are passed through the grinder 50 to reduce the blocks into suitably-sized particles 54. A portion of the heated air flows through the conduit 68 and through the hopper 46 and the grinder 50; gravity, the diverted hot air and any metering device carry the expanded thermoplastic polystyrene polymer particles 54 into the conduit 57 and through the aperture 59 into the chamber 20. The blower 34 moves a sufficient flow of air through the first conduit 24 and into the chamber 20 to suspend the particles with the air in the chamber. The heated air enters the chamber 20, flows in a helical flow through the chamber to the opening 64 in the baffle 60, and exits the chamber at the outlet 42 into the second conduit 40. The blower 36 recirculates the air through the housing 30 and the heat source 34 before the air re-enters the first conduit 24 and the chamber 20. Each polystyrene polymer particle 54 remains suspended in the hot air flow until it has absorbed sufficient heat to soften and densify the polymer. The pieces 80 of densified thermoplastic polystyrene polymer are too dense to remain suspended in the air flow and fall out of the chamber into the outlet cone 18 and through the opening 22. The pieces 80 of densified thermoplastic polymer can be further compressed, for example, by passing the pieces through heated pinch rollers (not shown) located below the outlet cone 18.

The densified thermoplastic polymer occupies only about 7% of the original volume of the expanded thermoplastic polymer. Thus, an expanded polystyrene polymer having a density of about 16 kg/m$^3$ (1 pound per cubic foot) will form a densified polystyrene polymer having a density of about 240 kg/m$^3$ (15 pounds per cubic foot).

Although the process of densifying an expanded thermoplastic polymer has been described as a continuous process, when the polymer particles are mixed with other particulate matter such as starch fill particulate matter, the polymer is separable from the particulate matter by operating the apparatus in a discontinuous process. A mixture of thermoplastic polymer loose fill peanut-shaped or S-shaped particles and particulate matter such as starch fill is introduced into the chamber 20 through the aperture 59 and the particles and the particulate matter in the mixture are suspended with a fluid flow in the chamber and heated as previously described. The particles of thermoplastic polymer soften and densify, becoming too dense to remain suspended in the fluid flow. The densified pieces 80 of thermoplastic polymer fall through the outlet cone 18 and are collected. The starch fill particulate matter remains suspended in the fluid flow. The blower 34 is then turned off, interrupting the fluid flow. When the suspending fluid ceases to flow, the remaining particulate matter falls from the chamber 20 through the outlet cone 18 and is collected separately from the densified polymer. An additional mixture of thermoplastic polymer particles 54 and particulate matter is then introduced into the chamber 20 and the process is repeated.

Thermoplastic polymer film may also be densified by the method of the present invention. Thermoplastic films such as low density polyethylene films are loaded into the hopper 46 and passed through the grinder 50 to produce particles of film which are suspended with a fluid flow in the chamber 20 and heated as described generally above. The particles of film are heated to within the softening range of the low density polyethylene, for example, to at least 145° C., to soften and densify the polymer, collapsing the structure of the film and causing the film to pucker. The pieces of puckered film are too dense to remain suspended in the fluid flow and fall from the chamber 20 through the outlet cone 18.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of densifying an expanded thermoplastic polymer, comprising:
   (a) introducing particles of a thermoplastic polymer into a chamber;
   (b) suspending said particles with a fluid flow in said chamber; and
   (c) during step (b), heating and softening said particles to form pieces of densified thermoplastic polymer which are too dense to remain suspended in said fluid flow.

2. The method of claim 1 wherein said particles are introduced proximate the bottom of said chamber.

3. The method of claim 1, including introducing a hot gas proximate the bottom of said chamber and flowing said hot gas through said chamber to provide said fluid flow.

4. The method of claim 3, including entraining said particles in said hot gas.

5. The method of claim 3 wherein said hot gas is removed from the top of said chamber while maintaining said particles in said chamber.

6. The method of claim 1 wherein said fluid flow is a helical flow through said chamber.

7. The method of claim 1, including removing from said chamber said pieces of densified thermoplastic polymer.

8. The method of claim 1 wherein said fluid flow is a gas flow.

9. The method of claim 1, including introducing a gas proximate the bottom of said chamber and removing said gas from said chamber proximate the top of said chamber to produce said fluid flow, and thereafter returning said gas to said chamber proximate the bottom of said chamber and recycling said gas through said chamber.

10. Apparatus for densifying an expanded thermoplastic polymer, comprising:
    (a) a vertical chamber having a bottom and a top for fluid flow therethrough;
    (b) means for providing fluid flow through said chamber from said bottom to said top of said chamber; and
    (c) means for providing helical fluid flow through said chamber, wherein said means for providing helical fluid flow includes a baffle.

11. The apparatus of claim 10, including a conduit connected proximate said bottom of said chamber for introducing a fluid into said chamber.

12. The apparatus of claim 10 wherein said baffle includes a cylinder proximate said bottom of said chamber.

13. The apparatus of claim 12 wherein said cylinder is a right circular cylinder.

14. The apparatus of claim 10 wherein said means for providing fluid flow is a nozzle means.

15. The apparatus of claim 10 wherein said means for providing fluid flow includes means for heating said fluid.

16. The apparatus of claim 10, including means for heating said chamber.

* * * * *